(12) United States Patent
Van Noetsele

(10) Patent No.: US 8,424,047 B2
(45) Date of Patent: Apr. 16, 2013

(54) MESSAGE TRANSMISSION IN AN INTERACTIVE TELEVISION SYSTEM

(75) Inventor: Robert Van Noetsele, Middlebeers (NL)

(73) Assignee: UPC Broadband Operations BV, Schiphol-Rijk (NL)

( * ) Notice: Subject to any disclaimer, the term of this patent is extended or adjusted under 35 U.S.C. 154(b) by 2244 days.

(21) Appl. No.: 10/383,937

(22) Filed: Mar. 7, 2003

(65) Prior Publication Data

US 2004/0003410 A1    Jan. 1, 2004

(30) Foreign Application Priority Data

Mar. 7, 2002    (GB) .................................. 0205403.9

(51) Int. Cl.
*H04N 7/173*    (2006.01)
*H04H 60/32*    (2008.01)

(52) U.S. Cl.
USPC ........................................................ 725/105

(58) Field of Classification Search .................... 463/40, 463/42; 370/282, 312, 395.21, 395.4, 519, 370/515; 725/60–61, 24, 121, 105, 132, 725/139–140, 135–136, 16, 116, 126, 9, 725/13, 114, 115, 131
See application file for complete search history.

(56) References Cited

U.S. PATENT DOCUMENTS

| | | | | |
|---|---|---|---|---|
| 5,684,526 A * | 11/1997 | Yoshinobu | ..................... | 725/131 |
| 7,110,419 B1 * | 9/2006 | Linander | ...................... | 370/461 |
| 7,251,820 B1 * | 7/2007 | Jost et al. | ...................... | 725/107 |
| 2005/0235148 A1 * | 10/2005 | Scheidt et al. | ................ | 713/168 |

FOREIGN PATENT DOCUMENTS

| | | |
|---|---|---|
| EP | 1176828 A2 | 1/2002 |
| FR | 2734973 A1 | 12/1996 |
| WO | WO01/01232 A1 | 1/2001 |
| WO | WO-01/91415 A2 | 11/2001 |

* cited by examiner

*Primary Examiner* — John Schnurr
(74) *Attorney, Agent, or Firm* — Harrington & Smith

(57) ABSTRACT

A method for controlling transmission of messages in an interactive television system comprising a network and a plurality of receiver units connected to the network; the method comprising: transmitting to the receiver units an trigger inviting a response from each receiver unit and indicating that a delay procedure is to be applied to the responses; and at each receiver unit: accepting from a user of the receiver unit data in response to the trigger; forming a response message for transmission to the network in response to the trigger, the response message including the data received from the user; determining the length of a delay interval to be applied to the response message; and transmitting the response message to the network after the delay.

20 Claims, 3 Drawing Sheets

—PRIOR ART—

MESSAGE TRANSMISSION IN AN INTERACTIVE TELEVISION SYSTEM

This invention relates to interactive television systems, and in particular to controlling the transmission of messages in an interactive television system.

A typical interactive television, system is shown in FIG. 1 of the attached set of drawings. The system includes a digital video data provider 1, decoders 3a-c for converting the digital video data to an analogue format, a television 5 at each decoder for displaying the video data, and enhanced content transmitted over a network 2. In current systems, the enhanced content is transmitted to decoders, or set-top boxes (STBs), which then display pages of enhanced content on a television. A user input device 4 is provided at each decoder 3a-c so that a user can adjust settings of the decoder and/or the television 5 and respond to queries or questions in the enhanced content. The user input device 4 could, for example, be a keypad or remote control.

The term enhanced content is used herein to refer to content available to be played out at the request of a user onto a television screen. The enhanced content could be in addition to the basic video data of a television programme or movie. It may consist of information, such as news, television schedules, or weather reports, or may invite a response from a user.

Enhanced content may be transmitted over a network independently of video data, or alternatively may be embedded in the video data.

The term "interactive television" suggests that a viewer can provide input to the system, for example to respond to queries within the enhanced content or to control the video stream that he receives. An example of a user input/response is an answer to a question posed in the enhanced content (or interactive content). If the video content being displayed on a television is, for example, a quiz show, it may be desirable to provide interactive content consisting of quiz questions corresponding to those being asked in the quiz show.

It may be the case that many set-top box users may wish to participate in an interactive quiz simultaneously. If the quiz is related to a particular broadcast or event (for example, a game show), its presentation might be synchronised with that broadcast. For example, a question for the set-top box user to respond to might be presented on screen concurrently with a question in the video and audio of a game show. The set-top box user may have a limited time to answer the question.

The response messages from set-top boxes will be transferred substantially simultaneously over a back channel to a system for handling the responses. The back channel will have a limited bandwidth, and if, say, one million users respond to the interactive quiz application, the huge amount of feedback might overload the back channel. In addition, the enormous amount of processing to be performed by the receiving system might overload the receiving system. A solution to these problems is required.

According to the present invention there is provided a method for controlling transmission of messages in an interactive television system comprising a network and a plurality of receiver units connected to the network; the method comprising transmitting to the receiver units an invitation message inviting a response from each receiver unit and indicating that a delay procedure is to be applied to the responses; and at each receiver unit accepting from a user of the receiver unit data in response to the invitation message; forming a response message for transmission to the network in response to the invitation message, the response message including the data received from the user; determining the length of a delay interval to be applied to the response message; and transmitting the response message to the network after the delay.

The length of the delay interval is preferably based on at least one property of the receiver unit. The property could, for example, be the location of the receiver unit, the identity of the receiver unit, or the identity of a subscriber or a user of the receiver unit, or an attribute of the set-top box such as its MAC address, country code, zip code, receiver unit ID and customer ID.

The invitation message need not be a message whose purpose is only to invite the response. For example, the invitation message could also define the layout of a form that is to be completed to form the response, or could provide other data that can be used to indicate to a user that a response can now be submitted.

The plurality of receiver units connected to the network are suitably grouped in some way with receiver units of the same group applying the same delay to their respective response messages. The grouping of the receiver units could be independent of the geographical location of the receiver units. Most preferably the grouping is performed in such a way as to ensure that a similar number of receiver units belongs to each group so that when a large number of response messages would in prior art systems have been transmitted concurrently, the method of the present invention will transmit a substantially equal number of response messages between each delay interval. The grouping of the receiver units could suitably be performed randomly.

Other preferred aspects of the present invention are set out in the dependent claims.

The invention will now be described by way of example with reference to the accompanying set of drawings, in which.

As mentioned above, the method of the present invention can suitably involve grouping together a set of receiver units by some means. In the example system of FIG. 2, set-top boxes (STBs) 11a-11d, 12a-12d and 13a-13d are grouped by geographical location to form groups 21, 22 and 23. In this example, each group contains the same number of STBs. It is advantageous for groups in a practical interactive television system to be likewise similar in size. This helps to ensure that the number of messages sent at a given instant remains near to an average value, rather than at times becoming very large. This could obviously create the problems described above of overloading the back channel through which the messages are transferred and overloading the receiving system towards which the messages are transmitted.

Figure 1:
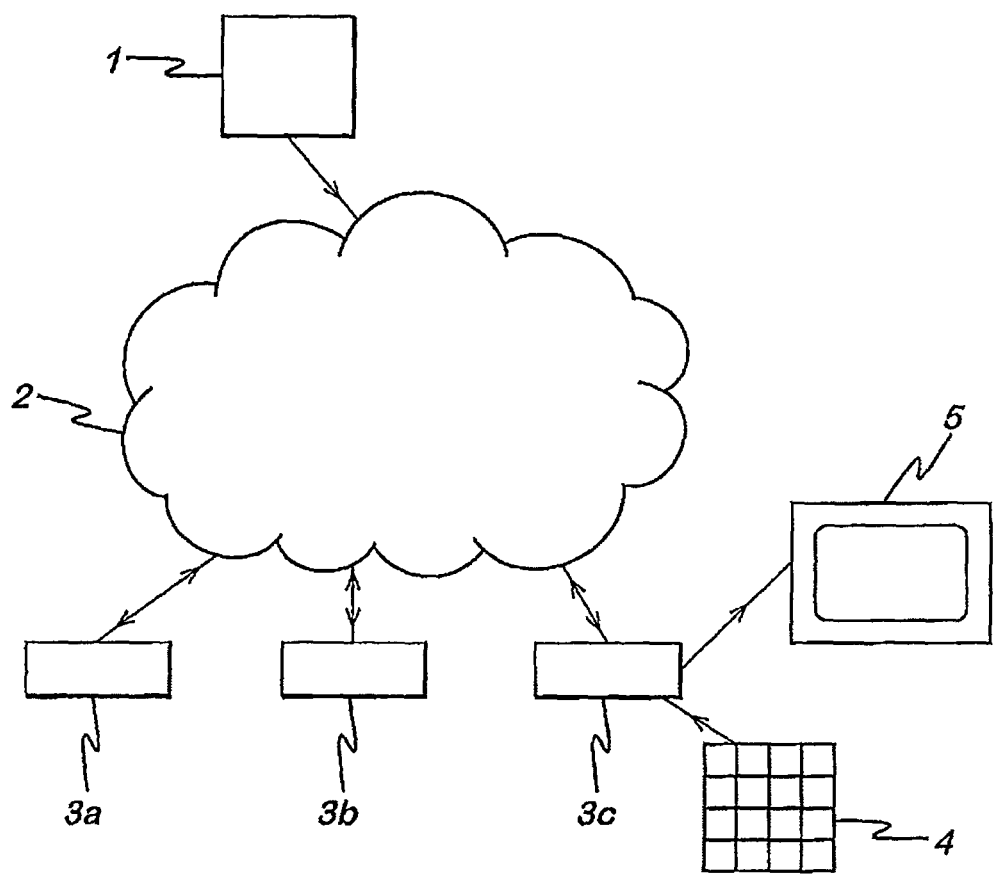
FIG. 1 shows a prior art interactive television system.
Figure 2:
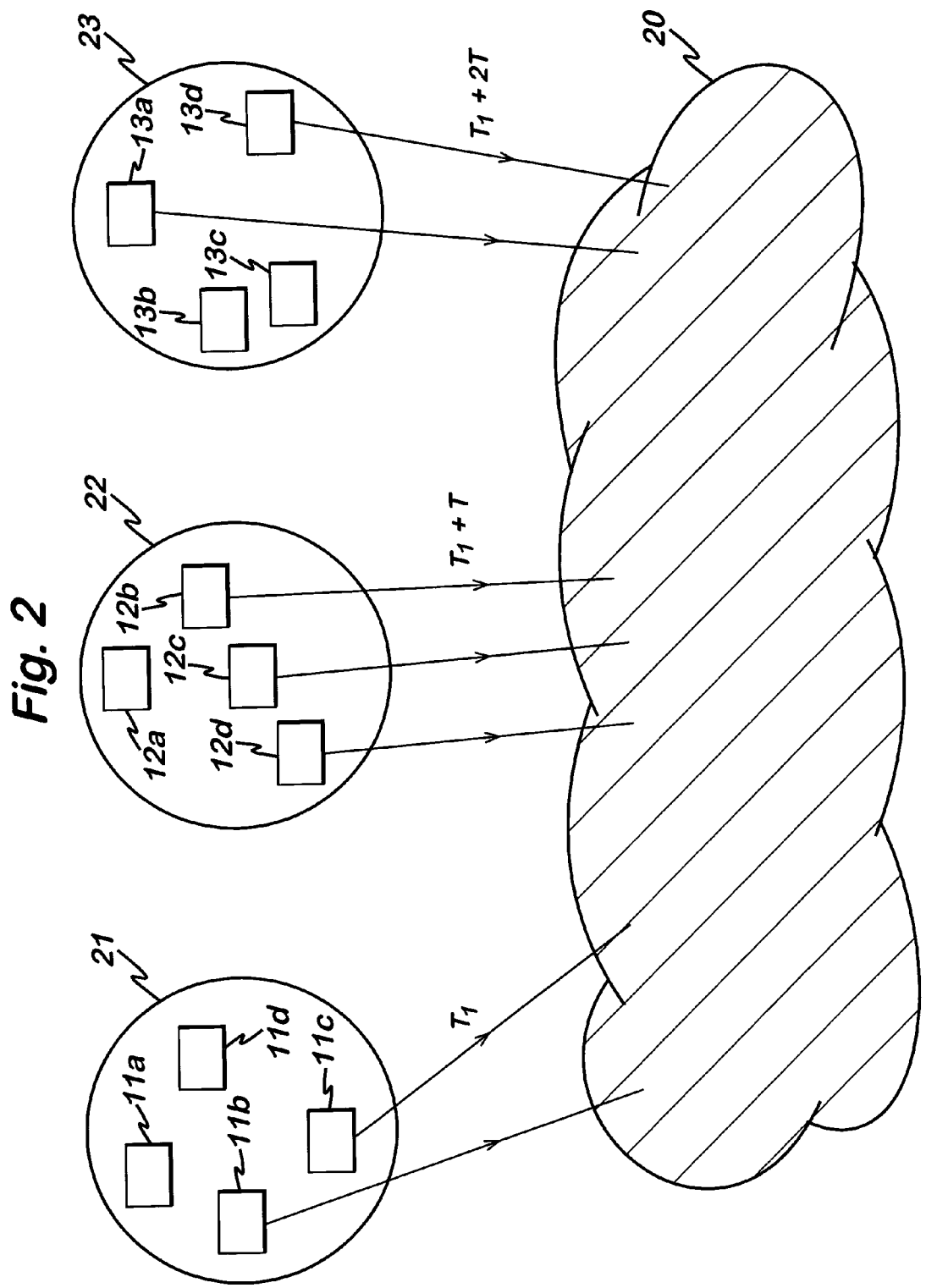
FIG. 2 shows transmission of messages from receiver units towards a network in an interactive television system.

In the example of FIG. 2, STBs 11b, 11c, 12b, 12c, 12d, 13a and 13d each wish to send a response message to the network 20. This implies that, for example, a question may have been posed to STB users via enhanced content, and the users of the STBs listed above have each inputted their response into their respective STBs. At each STB, a delay will be imposed on the transmission of the messages, the length of the delay depending on the group to which the STB belongs. In this scaled-down situation, group 21 may impose zero delay, while group 22 imposes a single time unit delay and group 23 imposes two time units of delay. As an example, one time unit may be 2 seconds, so that messages from group 23 will be transmitted 4 seconds after those from group 21.

This simple example serves to illustrate the fact that the instantaneous rate of transmission of data is reduced compared with prior art systems in which each of the seven messages would be transmitted as the messages were formed in the STBs. In a situation where a quiz application is operating, most viewers may answer a question within a few seconds of each other and there would thus be a surge of messages transmitted across the network in a very short time.

An example of a system for grouping together STBs is with the use of an intelligent communication algorithm. The algorithm could be based on one or a combination of the following attributes: user/customer/set-top box identifier (e.g. a username, MAC-address, etc.); region information (e.g. zip code, country code, etc.). Any STB attribute may suitably be used for grouping STBs. A user identifier could be a user identity or password entered by a user at the start of an interactive application. This identity/password could be unique to the user and could be used by the user each time the user takes part in an interactive application. Alternatively, a user identifier could be specific to a particular interactive application such as a quiz application so that a given user may have different identifiers for different applications. A customer identifier could be specific to an account held by a user of a particular STB, such as an account with a service provider. This customer identifier may therefore be specific to a family or to an address.

The algorithm would be configured to define a set of groups based upon a particular attribute of the STBs, for example a MAC-address, which would have the following format: ############ where # is a hex-digit (0-F), e.g. 08006F91050A. The MAC-addresses could be divided into 256 groups according to their last two hex-digits: for example, MAC-address 08006F91050A would belong to group 0A.

The algorithm then defines a timeslot for each group or a fixed duration per group, e.g. 2 seconds per group, thus, for example, messages from STBs in group 0A may be sent first, then after 2 seconds, messages from STBs in group 0B, and after a further 2 seconds, messages from STBs in group 0C, and so on. Every message would be sent within 2×256=512 seconds, or about 8½ minutes.

This algorithm ensures that communication density is divided over a fixed timeframe. Defining the groups and timeslots in a way based on statistics or demographic information, for example, is key in achieving an evenly distributed communication process, which results in a controlled and limited use of bandwidth and processing capacity of the receiving system.

The algorithm could be built into STBs, or alternatively could be downloaded to STBs along with an invitation message sent from the network to the STB. The algorithm could be part of the enhanced TV application.

An alternative to the grouping method is for each receiver unit to apply a random delay interval to each response message transmitted. This has the advantage that STB properties need not be queried, thus simplifying the system, but also has the disadvantage that in a given time interval it could happen that a very large number of response messages are sent, and the system could overload.

Figure 3:
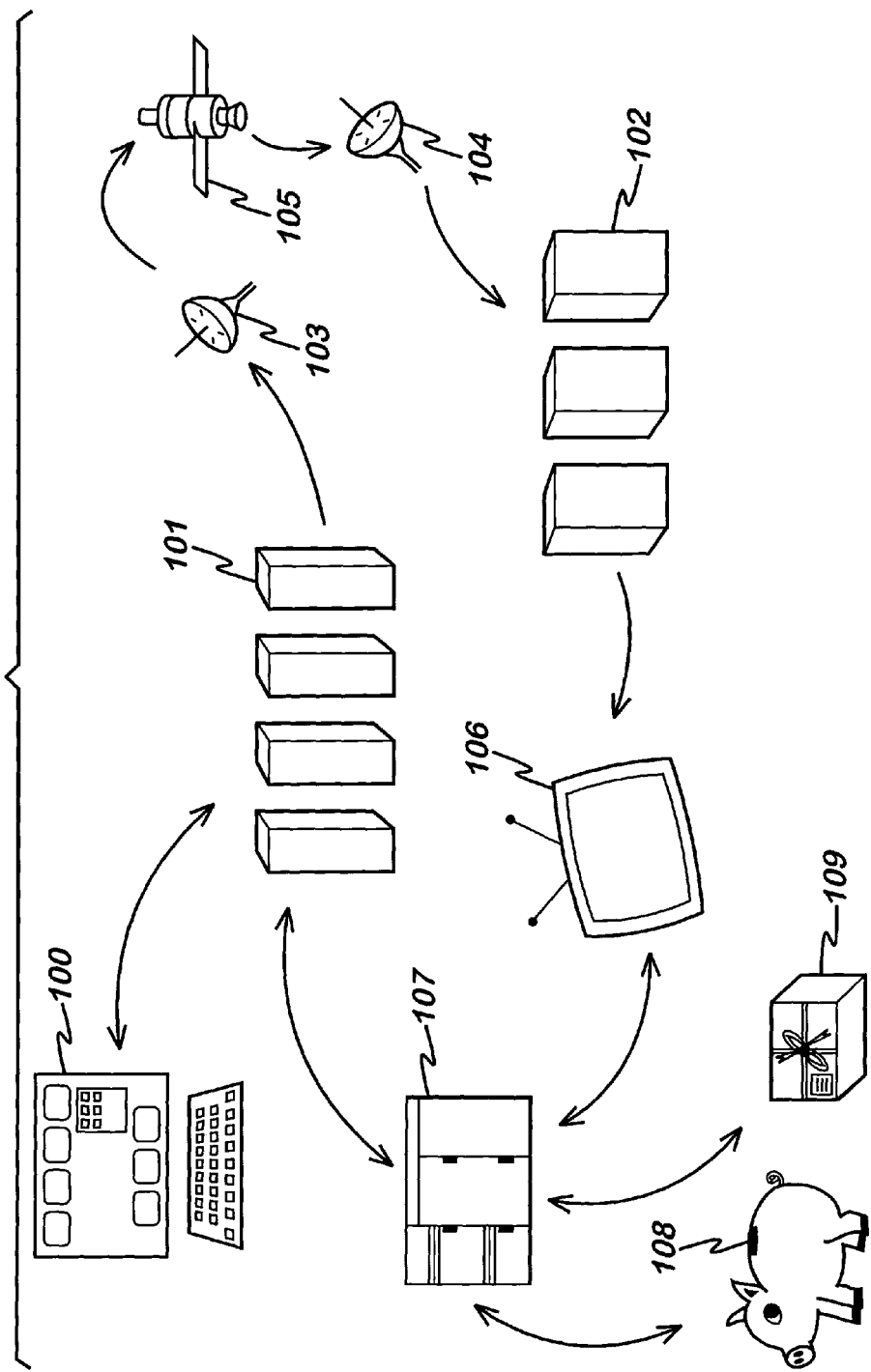
FIG. 3 shows an interactive television network.

FIG. 3 shows an example of a broadcast network in which the present method may be employed.

The network shown in FIG. 3 comprises an Edit Suite 100, a Playout Management Centre 101, a Media Control Manager 102, uplink and downlink stations 103 and 104, a satellite 105, a decoder 106, and a Transaction Management System 107. The decoder 106 may, for example, be a set-top box or a digital television. Each of the components of the system will be described in turn. The components can communicate with each other as indicated by the arrows in FIG. 3.

Interactive content is produced at the Edit Suite 100 (specifically, in a Content Production Manager (CPM)) on generic re-usable templates. The general templates can be manipulated by designers to produce a template with the desired format for a particular application. This specific template can then be saved to the memory of the CPM. Subsequent data can be added easily and quickly to the application-specific template, for example, daily news, weather or TV guides.

Once data has been added to a template at a CPM, the populated template is inputted to an Event Broker Console (EBC), the second stage of an Edit Suite, where it has a stream script added to it.

Meta-data is then added to the main broadcast stream (i.e. the video stream) that is associated with the content of the template. The meta-data allows the stream script to be triggered in real-time to synchronise the content with the main broadcast stream. For live television events, the EBC can be used to manage the broadcast of interactive pages, as will be described later.

Following production at the Edit Suite, the template data is passed to a Playout Management Centre (PMC) 101, which converts the data to a signal (representing pages of interactive content) in the relevant format for any platform on which it is to be received and displayed. The PMC can store the interactive content until it is needed. Once the interactive content is required, it is transmitted to a Media Control Manager (MCM) 102. To reach the MCM the interactive content could be sent to an uplink station 103 and transmitted via a satellite 105 to a downlink station 104 or could be sent in another way, for instance by cable.

The MCM 102 is located in a cable TV digital head end. The MCM receives interactive data from a PMC 101, stores it until it is to be played out, and, in response to receiving a trigger, broadcasts it to decoders 106. The decoders could be set-top boxes connected to televisions, or they could be digital televisions.

The MCM can be informed in a number of ways of when to cause a page of interactive content to be played out, by being transmitted from the MCM to the decoder 106, and subsequently displayed. For example, if the television event to which the interactive content is related is being broadcast live, then an editor at an Edit Suite 100 can manually trigger the play-out of the content from the MCMs 102. To ensure that the content is synchronised with an appropriate part of the television event. A trigger would be sent from the Edit Suite 100 to the PMC 101; the PMC would transcode the trigger and forward it to the MCM 102, and then the MCM would broadcast the trigger towards decoders 106. Alternatively, triggers can be arranged to be sent automatically at predetermined times during a television event. In this case, the MCM has access to a time schedule and on the basis of this schedule, sends triggers to decoders at the times when it is desired for the interactive content to be played out. For instance, a TV programme might start at 7.30 pm, and triggers could then be sent automatically from the MCM 102 at 7.31 pm, 7.35 pm, 7.42 pm and so on, depending on the parts of the programme with which each page of interactive content is related. As another alternative, markers could be embedded in the video signal associated with a particular set of interactive pages, and triggers could be generated in dependence on the association between the markers and the pages. These markers would be the meta-data referred to above which is added to the video stream.

The MCM 102 can also manage the bandwidth allocated to video signals and interactive content signals according to television events taking place. Content can also be stored/buffered at the MCM.

A Transaction Management System (TMS) 107 is employed to deal with responses of subscribers to the interactive content broadcast. The TMS is capable of handling large numbers of concurrent responses, and can produce, for example, lists of winners of a competition following the subscriber responses. The TMS is linked to the PMC so that information related to subscriber responses can be fed back and inserted into broadcasts from the MCM 102. In addition, the PMC can communicate with the TMS.

For handling payments to action user responses the TMS is linked to a banking system 108. The TMS may send signals to other functions such as a third party fulfilment centre 109 so as to action user responses, for example to fulfil purchases or issue prizes.

Editors at the Edit Suites 100 can communicate with the TMS 107 via PMC 101 in order to determine how the TMS should react to responses sent from subscribers.

In the network of FIG. 3, the Playout Management Centre 101 may comprise the signal formatting apparatus 10 of FIG. 2.

In a system as described above with reference to FIG. 3, there would typically be multiple Edit Suites 100, one PMC 101, multiple MCMs 102 distributed geographically across an area served by the network, and one TMS 107, although in future it may be desirable in terms of efficiency to provide multiple PMCs and/or TMSs. Decoders 106 would be positioned locally to individual viewers, for example in their homes or in public buildings.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method for controlling transmission of messages in an interactive television system comprising a network and a plurality of receiver units connected to the network; the method comprising:
    transmitting to the receiver units an invitation message inviting a response from each receiver unit and indicating that a delay procedure is to be applied to the responses; and at each receiver unit:
    accepting from a user of the receiver unit data in response to the invitation message;
    forming a response message for transmission to the network in response to the invitation message, the response message including the data received from the user;
    determining the length of a delay interval to be applied to the response message; and
    transmitting the response message to the network after the delay, wherein the length of the delay interval is based on at least one identity held by the receiver unit, and wherein the at least one identity of the receiver unit includes information relating to the geographical position of the receiver unit.

2. A method according to claim 1 wherein an algorithm queries the at least one identity of the receiver unit to determine the length of the delay interval.

3. A method according to claim 1 wherein the at least one identity of the receiver unit includes a user identifier.

4. A method according to claim 1 wherein the at least one identity of the receiver unit includes a customer identifier.

5. A method according to claim 1 wherein the at least one identity of the receiver unit includes a receiver unit identifier.

6. A method according to claim 1 wherein the at least one identity of the receiver unit includes a MAC address.

7. A method according to claim 1 wherein the at least one identity of the receiver unit includes a zip code.

8. A method according to claim 1 wherein the at least one identity of the receiver unit includes a country code.

9. A method according to claim 1 wherein the receiver unit is a set-top box.

10. A method according to claim 1 wherein the length of the delay interval applied to the response message from the receiver unit differs from lengths of delay intervals applied to response messages from others of the plurality of receiver units connected to the network.

11. A method according to claim 10 wherein each group has associated with it a predetermined length of delay interval.

12. A method according to claim 1 wherein the receiver units are each allocated a group.

13. A receiver unit for use in an interactive television transmission system comprising a network, the receiver unit comprising:
    a first input for receiving an invitation message transmitted from the network, the message inviting a response from the receiver unit and including an indication that a delay procedure is to be applied to the responses;
    a connection to a display unit for displaying an invitation to a user;
    a second input for accepting from the user data in response to the invitation;
    a message writer for writing a response message including the data from the user;
    a delay unit for applying a delay interval to the response message; and
    an output for outputting the response message to the network after the delay interval, wherein the delay interval is based on at least one identity held by the receiver unit, and wherein the at least one identity of the receiver unit includes information relating to the geographical position of the receiver unit.

14. A receiver unit according to claim 13 wherein the at least one identity of the receiver unit includes a user identifier.

15. A receiver unit according to claim 13 wherein the at least one identity of the receiver unit includes a customer identifier.

16. A receiver unit according to claim 13 wherein the at least one identity of the receiver unit includes a receiver unit identifier.

17. A receiver unit according to claim 13 wherein the at least one identity of the receiver unit includes a MAC address of the receiver unit.

18. A receiver unit according to claim 13 wherein the at least one identity of the receiver unit includes a zip code.

19. A receiver unit according to claim 13 wherein the at least one identity of the receiver unit includes a country code.

20. A receiver unit according to claim 13 wherein the receiver unit is a set-top box.

* * * * *